Aug. 31, 1943.  A. JACOBOWITZ  2,328,148
FILTER
Filed Oct. 29, 1940
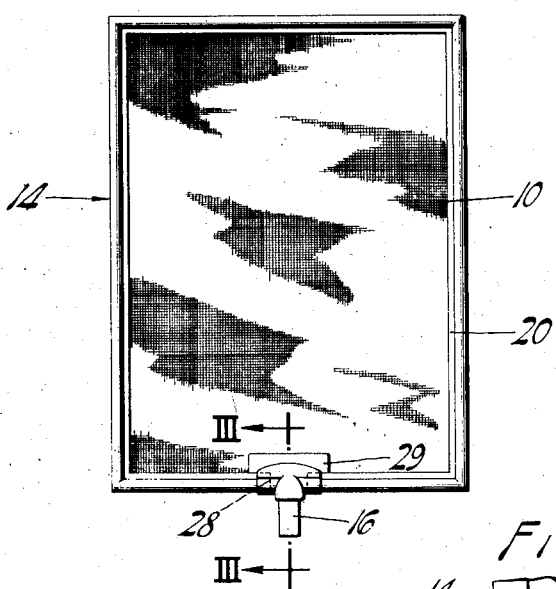
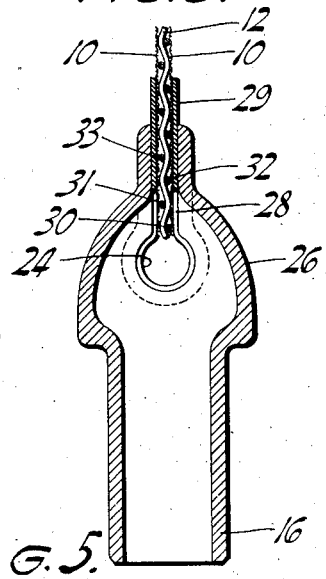
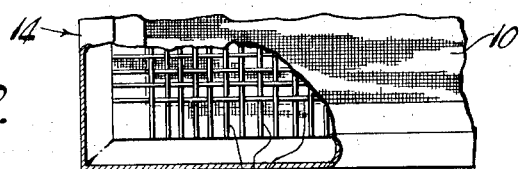
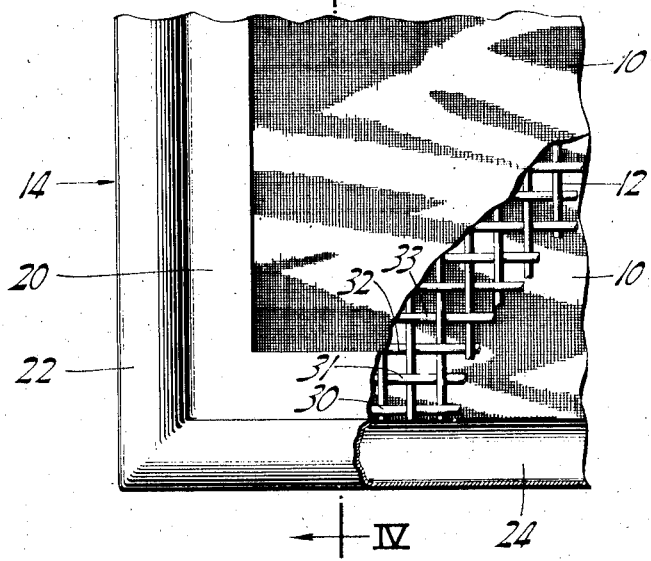
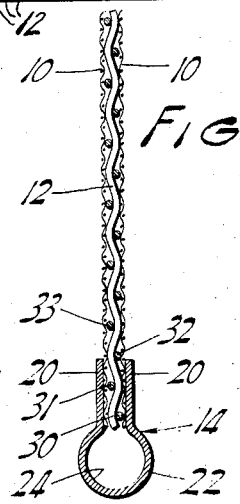
INVENTOR
ARNOLD JACOBOWITZ
BY
Bean, Brooks, Buckley & Bean.
ATTORNEYS Patented Aug. 31, 1943

2,328,148

UNITED STATES PATENT OFFICE 2,328,148

FILTER

Arnold Jacobowitz, Buffalo, N. Y.

Application October 29, 1940, Serial No. 363,269

2 Claims. (Cl. 210—181)

This invention relates to filtration systems, and more particularly to filtration devices of the pressure filter screen type for use, for example, in connection with filtration of solids and sedimentary substances from beverages, or the like.

The primary object of the invention is to provide an improved filter device for the purpose described which is especially designed to avoid deposition internally thereof of substances previously suspended within the liquid to be filtered. Consequently, the invention is particularly useful in connection wtih the filtering of beverages or any liquids which are subject to contamination when in contact with deteriorated substances which may have lodged within the filter. A more specific object of the invention is to provide an improved form of pressure filter screen device which is self-cleaning internally and susceptible of being thoroughly cleaned externally with the utmost ease and facility. Other objects and advantages of the invention will appear in the specification hereinafter.

In the drawing:

Fig. 1 is an elevation of a filter of the invention;

Fig. 2 is a fragmentary typical corner portion thereof, on an enlarged scale, with portions broken away to show the interior;

Fig. 3 is a section taken substantially along line III—III of Fig. 1;

Fig. 4 is a section taken along line IV—IV of Fig. 2; and

Fig. 5 is a fragmentary view illustrating details of the filter structure.

The drawing exemplifies the invention in the form of a filter screen unit of the type that is adapted to be arranged individually or in multiples within an enclosing pressure tank into which the liquid to be filtered is introduced under pressure. The filter element comprises essentially a pair of opposed spaced screen elements 10 and mounted therebetween a spacing device in the form of a sheet 12 of relatively coarser wire mesh material. The screen elements 10 and the spacer 12 are bound together as an integral unit about their marginal edge portions by means of a perimetral binding element designated generally by the numeral 14. A fluid outlet conduit 16 located at any desired point relative to the perimeter of the unit is arranged in open communication at its inner end with the interior of the filter device as defined by the space between the screening elements 10. Thus, subsequent to filtration of the liquid being treated through the screening elements 10 from externally thereof and into the space therebetween, the filtered liquid is free to flow into the binding 14 and thence into the outlet conduit 16, and thence into suitable connecting conduits to the point of discharge of the finished product.

More specifically, the filter device of the invention is particularly adapted to use in connection with built up cake-type filtering mediums such as are commercially available in the form of finely powdered mineral substances. As is well known in the art, such filter-aid materials may be mixed into the liquid to be filtered prior to its being conducted to the filtering device, and as the liquid passes through the screening elements 10 the filter-aid substance accumulates upon the outer faces of the filtering elements and builds thereon corresponding filtering cake layers having such minute interstices as to be adapted to collect thereon even the minutest of particles suspended in the liquid to be treated. While I am aware that the use of such filter-aid materials in conjunction with filtering screen devices has been previously practiced in the art, I have discovered that filtering devices of the general structural form hereinabove described are susceptible to accumulation of filter-aid particles and sedimentary particles previously suspended in the liquid being treated in regions of relatively low liquid velocity within the interior of the screening structure. For example, in the case of filtering screens of the prior art which resemble in general form the screen of Fig. 1 herein, I have found that prior to complete building of the filter-aid cake upon the outer faces of the screening elements, and perhaps even during subsequent operation of the filtering screen, there is a marked tendency for sedimentary particles suspended within the liquid being treated and filter-aid particles to deposit and accumulate in the perimetral binding of the screen structure. This appears to be the result of a marked reduction in liquid velocity (of the liquid moving through the interior of the screening structure toward the outlet conduit 16) in the region of the binding, and because of the fact that the screening structures of the prior art are bound at the marginal edge portions thereof by means of binding elements that bear laterally against the edge portions of the screening elements in such manner as to close the corresponding ends of the filtering structures at the ends of the screen sheet elements. Hence, in these prior art devices, there are accumulations internally of the filter elements which are in certain cases composed of the filter-aid materials and organic materials which are subject to decay and deterioration. Such deposits start immediately upon putting the filters into use, and furnish bases upon which further depositions accumulate, thus reducing the effective filtering capacity of the device and introducing sources of contamination and infection or other causes of undesirable changes in the filtrate.

The present invention contemplates the provision of an improved form of edge binding element which is illustrated in detail in Figs. 2 and 4. In the case of the invention the binding element 14 is generally of U-shaped sectional form (Fig. 4) with parallel coextensive leg portions 20 disposed in clamping relation against opposite face portions of the screening elements 10 adjacent their marginal edges. The closed end portion of the binding member is somewhat enlarged and is of rounded sectional form as illustrated at 22 so as to provide thereat an open unobstructed channel 24 about the entire perimeter of the screen device which is in open communication with the interior of the space between the screening elements 10. The channel 24 is of such sectional dimensions as to preclude any possibility of lodgment of solid matter that may pass through the screen elements 10. As illustrated in Fig. 3, the outlet conduit 16 is formed with an enlarged upper end portion 26 which embraces and is mounted upon the adjacent portion of the binding member 14 which is cut away as at 28 so as to provide the interior of the screening structure in open communication with the interior of the outlet conduit 16.

Consequently, the filtered liquid passing through the screening elements 10 is free to flow between the screening elements 10 in all directions toward the perimeter of the screen device and through the correspondingly shortest path into the open channel 24 of the binding member 22, and thence around to the outlet conduit 16 in free flowing relation.

Filler plates 29 of sheet metal material are preferably installed at opposite faces of the screen unit in the region of the outlet connection 16 in such manner as to complement adjacent portions of the elements 20; thus providing flush surfaces against which the upper end portions of the connection 16 are lapped to provide proper welded or soldered connections between the outlet fitting 16 and the screen unit.

I have determined that in certain cases it is preferred to eliminate some of the wires that normally would parallel the binding element in the region thereof in order to prevent obstruction of liquid flow in these regions. For example, the wires 30, 31, 32 and 33 of Figs. 2, 3 and 4 may be withdrawn from the wire mesh sheet 12 prior to assembly of the structure; thereby providing completely open channels extending normally into the binding 14. Similarly, corresponding wires may be eliminated elsewhere about the perimeter of the device to provide this desired effect at all sides.

Thus, the invention provides a filtering screen structure which is closed at its perimetral edge portions for collection of filtered liquid and conveyance thereof to the product discharge point; and particular attention is called to the fact that the space provided between the screening elements 10 is fully open at all points about the perimeter of the device. Hence, the pressure differential between the interior of the screen device and the interior of the channel 24 (which is connected in open communication with a normal pressure outlet conduit) is at all times in favor of the interior of the screen device whereby any tendency to deposition of solid substances within the interior of the screen device adjacent the marginal edge portions thereof is prevented. Consequently, there are no dead spaces within the interior of the screen device and flow of fluid from the interior thereof into the outlet conduit 16 is at all times free and uniform in all directions toward the perimeter of the screen device. Thus deposition of solids such as are subject to deterioration is avoided, and contamination of the filtered product is prevented. Also, it will be understood that the filter of the invention is possessed of a higher initial capacity of filtrate flow; that is, it will provide for passage of filtrate at a greatly increased rate compared to filter devices of the prior art of equal filtering area.

It will be understood that the screen device of the invention is subject to being cleaned from time to time with improved facility, and that upon cleaning of the filter-aid cake therefrom, as may be required, the screen is thoroughly cleared of deposition substances and is then as suitable for re-use as a previously unused screen. While prior forms of screens are relatively susceptible of adequate external cleaning, it is impossible to clean them internally except by disassembly of the structural elements thereof. As distinguished from this, the filter of the present invention is of internally self cleaning nature, and therefore provides obvious important advantages.

It will be understood that the binding member 14 may be permanently fastened to the adjacent screen sheet elements by any suitable means such as soldering, or the like. However, I have determined that a preferred method of fastening the binding 14 to the screen sheet portions is by spot-welding or continuous seam welding the leg portions 20 of the binding member directly to the adjacent portions of the screens 10. Thus, the screen elements 10 and 12 are firmly locked together as an integral unit and are bound at their perimetral portions with the member 14 so as to provide a structurally strong filtering unit with the fluid-free marginal edges in open communication with the perimetral channel 24 leading to the outlet conduit.

It will be understood that although only one form of the invention has been shown and described in detail, it will be apparent to those skilled in the art that the invention is not so limited but that various changes may be made therein without departing from the spirit of the invention or the scope of the appended claims.

I claim:

1. A pressure filter device comprising a pair of opposed fine mesh wire screen members, a coarse mesh wire screen spacing member mounted between said fine mesh screen members and coextensively therewith as a spacer therefor, a member mounted in clamping relation upon the marginal edge portions of said screen members and having closed side portions extending from the edge portions of said screen members to form an unobstructed channel for liquid in open communication with the space between said fine mesh screen members extending continuously about the perimetral portions of said device, said screen spacing member having had removed therefrom prior to assembly of the device, the wire elements thereof normally disposed in the region of said perimetral clamping member and extending parallel to adjacent perimetral portions of said device.

2. A pressure filter device comprising a pair of opposed foraminous sheet members, a wire mesh screen spacing member mounted between said sheet members as a spacer therefor, a binder of a generally U-shaped sectional form mounted in a clamping relation upon the marginal edge portions of said sheet members and having its closed side portions extending beyond the perimetral limits of said sheet members so as to form an unobstructed perimetral conduit therearound in open communication with the space between said sheet members, said screen spacing member comprising in the region of said binder only spaced wire elements extending substantially perpendicular to said binder.

ARNOLD JACOBOWITZ.